US010518302B2

(12) United States Patent
Crichlow

(10) Patent No.: US 10,518,302 B2
(45) Date of Patent: Dec. 31, 2019

(54) SITE SELECTION FOR A DEEP UNDERGROUND NUCLEAR WASTE GEOLOGIC REPOSITORY

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 55 days.

(21) Appl. No.: 16/176,374

(22) Filed: Oct. 31, 2018

(65) Prior Publication Data

US 2019/0351467 A1 Nov. 21, 2019

Related U.S. Application Data

(60) Provisional application No. 62/671,506, filed on May 15, 2018.

(51) Int. Cl.
*G21F 9/36* (2006.01)
*B09B 1/00* (2006.01)

(52) U.S. Cl.
CPC ............... *B09B 1/008* (2013.01); *G21F 9/36* (2013.01)

(58) Field of Classification Search
CPC .................................. G21F 9/36; B09B 1/008
USPC ........................................................... 588/17
See application file for complete search history.

(56) References Cited

U.S. PATENT DOCUMENTS

| | | | |
|---|---|---|---|
| 5,850,614 A | 12/1998 | Crichlow | |
| 6,238,138 B1 | 5/2001 | Crichlow | |
| 6,654,704 B2 | 11/2003 | Wager | |
| 7,047,134 B2 | 5/2006 | Berger | |
| 8,055,547 B2 | 11/2011 | Kelly | |
| 8,117,138 B2 | 2/2012 | Apte | |
| 8,933,289 B2 | 1/2015 | Crichlow | |
| 2012/0221366 A1 | 8/2012 | Bowman | |
| 2018/0290188 A1 | 10/2018 | Crichlow | |

OTHER PUBLICATIONS

Baker-Hughes, "Autotrak Rotary Steerable Systems", Bakerhughes.com, Houston, Texas.

MacLachlan K, (2006): "Stratigraphy, structure, and silicification: New results from mapping in Flin Flon Mining Camp, Creighton, Saskatchewan"; vol. 2, 2006; Saskatchewan Geological Survey; Misc. Rep. 2006-4.2, CD-ROM, Paper A-9, 25p.

National Geographic Society, (2003) "The North America Tapestry of Time and Terrain".

USDoE, "Integrated Waste Management—Consent Based Siting"—(2016), Consentbasedsiting@hq.doe.gov.

US Nuclear Waste Technical Review Board, (Jan. 2016), "Technical Evaluation of the USDoE Deep Borehole Disposal Research and Development Program".

Cochener J, "Quantifying Drilling Efficiency", Office of Integrated Analysis and Forecasting, US Energy Information Agency, (Jun. 2010).

Mac Farlane A, Ewing R., "Uncertainty Underground, Yucca Mountain and the Nation's High Level Nuclear Waste"; MIT Press, Cambridge MA (2006).

Dutton S., "Depositional Systems and Hydrocarbon Resource Potential of the Pennsylvanian System, Palo Duro and Dalhart Basins, Texas Panhandle" (1980); Bureau of Economic Geology, University of Texas at Austin, Texas 78712.

Mitchell H., (1988), "Petroleum geology of the Palo Duro Basin and Pedernal Uplift provinces as a basis for estimates of undiscovered hydrocarbon resources", Dept of Interior, USGS pen File Report 87-450U; Denver, Colorado.

Paul E. Mariner, Joon H. Lee, Ernest L. Hardin, Frank. D. Hansen, Geoff A. Freeze, Anna S. Lord, Barry Goldstein, and Ron H. Price, "Granite Disposal of U.S. High-Level Radioactive Waste", Sandia Report SAND2011-6203.

Budnik R., (1989) "Tectonic Structure of the Palo Duro Basin, Texas Panhandle"; Bureau of Economic Geology, University of Texas at Austin, Texas 78713.

Meshkarian R, Penn ML, Williams S, Monks T (2017) "A facility location model for analysis of current and future demand for sexual health services"; PLoS ONE 12(8): e0183942. https://doi.org.10.1371/journal.pone.0183942.

*Primary Examiner* — Edward M Johnson
(74) *Attorney, Agent, or Firm* — Eric Kelly

(57) ABSTRACT

Method, apparatus and system for location evaluation and selection of a site, capable of effectively implementing a deep geologic repository for the disposal and storage of high-level nuclear waste and evaluating the waste location by scientific and technical analysis incorporating human and social interaction are provided. In one aspect, engineering, drilling, geological, geographic, and demographic data associated with a plurality of prospective implementation locations and human knowledge and physical infrastructure may be utilized in determining most desirable implementation surface drilling operations.

21 Claims, 6 Drawing Sheets

SITE SELECTION FOR A DEEP UNDERGROUND NUCLEAR WASTE GEOLOGIC REPOSITORY

PRIORITY NOTICE

The present application claims priority under 35 U.S.C. § 119(e) to U.S. Provisional Patent Application Ser. No. 62/671,506 filed on May 15, 2018, the disclosure of which is incorporated herein by reference in its entirety.

CROSS REFERENCE TO RELATED PATENT APPLICATIONS

The present patent application is related to previous patented inventions by the inventor related to the disposal of nuclear waste in deep underground formations. These U.S. utility patents are: U.S. Pat. Nos. 8,933,289, 5,850,614, and 6,238,138 and are all incorporated herein by reference in their entirety.

TECHNICAL FIELD OF THE INVENTION

The present invention relates generally to the disposing of nuclear waste and more particularly, the invention relates to (a) the siting of an ideal location for drilling the disposal wellbores used in waste disposal and (b) utilization of technical and analytical methods to optimally select a given specific location for the underground repository wellbore.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today there is a massive quantity of high-level nuclear waste accumulating across the world. In the U.S. alone there are more than 70,000 metric tons (MT) of high-level solid nuclear waste (HLW) being stored in cooling pools and in concrete casks on the Earth's (land's) surface. Such surface operations are very costly typically costing hundreds of millions of dollars annually. The HLW is generally called spent nuclear fuel (SNF) and consists of thousands of nuclear fuel assemblies which have been removed from nuclear power plants. There is a significant need for new processes to safely eliminate and/or greatly reduce the surface storage of this radioactive waste and to sequester this SNF waste in a safe manner for very long times at least more than 10,000 years. In this patent application HLW and SNF are used interchangeably to describe the solid nuclear waste product which is radioactive.

Nature has already developed a "safety deposit box" for high level nuclear waste. This "box" is the deep buried stable plutons, multi-million year old, basement rock intrusions into the near surface crust of the earth. This patent application illustrates, describes, and discloses methods, systems, and mechanisms that can access and utilize these natural "boxes" for disposal and storage of high level nuclear waste.

In this patent application the words pluton, craton and basement rock are used interchangeably and refer to the specific deep formation rock into which the repository for the nuclear waste may be implemented. In addition, the term site and location are used interchangeably in this patent application may generally refer to a land's surface location/site for receiving a drilling a rig and subsequent placement and drilling operations.

This patent application illustrates an internment process in deep basement rock structures. These basement rock structures are called cratons and plutons. Basement rock is the thick foundation of ancient, and oldest metamorphic and igneous rock that forms the crust of continents, often in the form of granite.

The term craton distinguishes the stable portion of the continental crust from regions that are more geologically active and unstable. Cratons can be synonymous with shields, described as the basement rock which crops out at the surface. Cratons may also be known as platforms, in which case the basement rock is overlain by sediments and sedimentary rock which are usually less dense and softer than the basement rock. A pluton may be an intrusive body of igneous rock that is crystallized from magma slowly cooling below the surface of the Earth. There may be different types of plutons, such as, batholiths, stocks, dikes, sills, laccoliths and other igneous formations.

To date (circa 2017), and based on the prior art, in order to provide satisfactory and economical final disposal of radioactive nuclear wastes, it is desirable that the radioactive nuclear wastes be sequestered in a system where it is isolated from the biosphere.

Based on the notable and inherent shortcomings of the prior art, e.g., costs, complexity, lack of public acceptance, environmental shortcomings, there exists a critical need for an effective, economical method for developing and utilizing deep geologic repositories. It is generally accepted by most nuclear and scientific experts that deep geologic burial is the best solution for long-term nuclear waste disposal.

The prior art contemplates drilling vertical wellbores directly into cratons from the land's surface. This subject invention illustrated herein, may initially use substantially vertical wells which may be drilled outside and relatively adjacent (proximate) to a given craton (or basement rock structure) to a predetermined vertical depth, and then by turning the drill bit to the substantially horizontal, continue drilling at least one lateral well which may continue substantially horizontally into the craton (or basement rock structure) body itself.

An objective of this invention may be to provide a deep geologic repository that is deep enough, drillable, capable, economic, and to maximize the benefits of basement rock disposal (storage) at the lowest possible cost without compromising safety and security.

To solve the above-described problems, the present invention may provide systems and methods to implement disposal of radioactive nuclear waste currently accumulating on the Earth's (land's) surface by optimally siting these deep geologic repositories by a combination of analytical methods, mechanical and physical processes to provide the best feasible working solution.

A novel approach as taught in this patent application may provide methods and systems wherein the radioactive nuclear waste disposal operations may be optimized from a site selection perspective.

Throughout this patent application the terms craton, pluton, and basement rock are used interchangeably and describe the specific basement rock structures which are very stable and usually igneous or metamorphic in nature or origin. These basement rock structures may be harder and/or more dense than sedimentary rock.

It is to these ends that the present invention has been developed.

BRIEF SUMMARY OF THE INVENTION

To minimize the limitations in the prior art, and to minimize other limitations that will be apparent upon reading and understanding the present specification, the present invention describes methods for selecting the site(s) of at least one substantially vertical wellbore on the land's surface for receiving nuclear waste for delivery of the nuclear waste into at least one underground basement rock structure that has at least one substantially lateral wellbores that is connected to the at least one substantially vertical wellbore.

The present invention is concerned with disposing of radioactive nuclear waste and, more specifically, to methods and systems of determining desirable sites (land surface sites) at which the initial (substantially vertical) wellbores may be used to provide surface entry into the deep geologic repository of basement rock that may in turn receive one or more substantially lateral wellbores that in turn may ultimately receive one or more capsules containing nuclear waste.

Some embodiment may describe methods, systems, and/or programs in which at least one substantially vertical wellbore may be sited to allow ingress into the final deep geologic repository of basement rock. Some embodiments may teach means for the repository siting based on physical characteristics and factors, and may comprise consideration of various predetermined human knowledge factors. The physical factors may comprise scientific physical data; while the human knowledge factors may comprise factors which relate to interactions with human populations.

An object of the present invention may be to provide methods of disposing of (storing) nuclear waste in deep underground rock formations (e.g., basement rock structures) by selecting a primary substantially vertical wellbore location that maximizes the overall efficiency of the disposal process.

An object of the present invention may be to provide methods of disposing of nuclear waste in underground rock formations which may provide sequestration of the HLW in the deep basement rock without the additional costs and complexity incurred by implementing and drilling the wellbore system completely in the "difficult to drill" basement rock intrusion.

It may be an object to provide methods of disposing of nuclear waste in underground rock formations which may essentially or effectively bury the radioactive waste in substantially horizontally extending lateral boreholes positioned in the matrix of basement rock intrusions.

Embodiments illustrated herein may achieve the following:

(a) maximize drilling of the substantially vertical wellbore in the relatively "easy to drill" geologic formations outside of the basement rock intrusion (which may be substantially sedimentary rock);

(b) minimize costly drilling of the substantially vertical wellbore by drilling in relatively easy and low-cost drilling of sedimentary rocks; and (c) minimize the drilling of the substantially lateral (horizontal) wellbores in the "difficult to drill," more expensive and more complicated drilling in basement rock sections.

It may be an object to provide at least one site which may be remotely located from major population centers; which may meet a set of preapproved parameters designed to provide a location that may be beneficial.

The subject embodiments may address methods of selecting at least one site for the primary substantially vertical wellbore connected to a nuclear waste repository in deep basement rock intrusions. The methods may comprise a step of selecting an area of land having a basement rock formation positioned therebelow. The basement rock formation may be of a depth able to prevent radioactive material placed therein from reaching the Earth's (land's) surface above over long periods of time, such as geologic times, and may be at least a predetermined distance from active water sources. The method may comprise drilling at least one substantially vertical wellbore from about 4,500 feet to 35,000 feet deep from the Earth's (land's) surface of the selected area which extends into the underground rock formation. A diameter of the substantially vertical wellbore and/or the substantially lateral wellbore may be between about 10 inches and to about 50 inches. The selected geologic storage formations may be a basement intrusion.

The surface entry site may be accessible by heavy equipment (e.g., drilling rigs), yet remote from public utilization and adjacent to a pluton or craton and be overlain by or adjacent to sedimentary rock formations which may protect the ecosphere from the radioactive nuclear waste and may allow for easy and economic drilling of substantially vertical wellbores sections of the repository in sedimentary rock adjacent to the basement rock formations that may receive at least one substantially horizontal wellbores for receiving the radioactive nuclear waste material.

In some embodiments, a specific proposed surface entry site location be analyzed using an algorithmic model which may strategically maximize benefits from each such proposed surface entry site location contemplated and by a subsequent ranking system allow selecting a desirable specific proposed surface entry site location result.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, some are not to scale, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1A may include sectional line A-B.

Figure 1A:
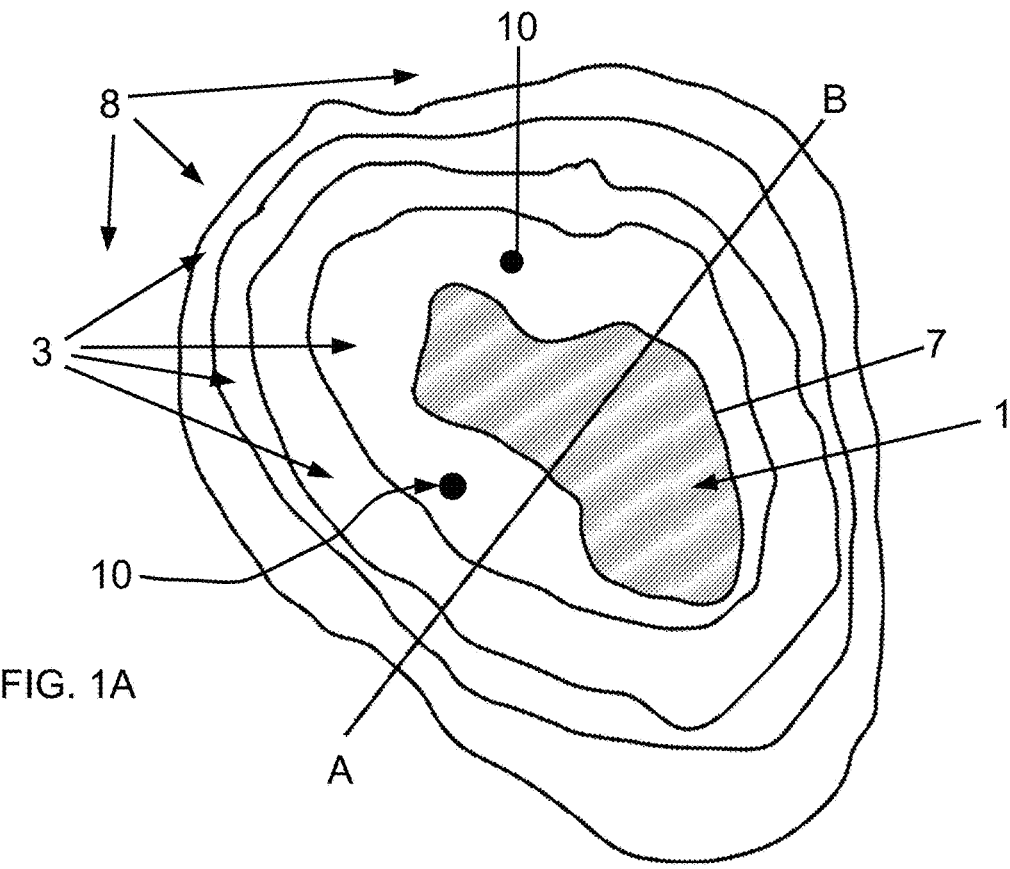
FIG. 1A may depict a region of surface exposed craton or basement intrusion, from a top view.

Table 1 may show determined results of a factor-ranking algorithm. Table 1 may be an example showing factors that may be involved in a location and siting strategy algorithm.

Table 2 may show DSI (drilling suitability index) data and LSI (location suitability index) data for a plurality of possible (prospective) surface drilling locations.

Table 1 and Table 2 in no way limits the possible parameters usable in the factor-ranking analysis for the waste disposal site.

REFERENCE NUMERAL SCHEDULE

With regard to the reference numerals used, the following numbering is used throughout the various drawing figures.
1 exposed basement rock 1
2 buried basement rock 2
3 sedimentary rock formation adjacent to basement rock formations 3
4 nuclear waste repository drilling rig 4
5 vertical wellbore system in sedimentary rock formations 5
6 lateral wellbore systems in basement rock 6
6A branching lateral wellbore 6A
7 surface boundary of the basement rock 7
8 land surface region adjacent to the exposed or above the buried basement rock 8
9 land surface near vertical wellbore site 9
10 potential repository vertical wellbore sites 10
11 capsules in repository system 11
12 deep geologic repository system 12
301 first predetermined depth 301
302 second predetermined depth 302
600 method of locating a deep underground nuclear waste repository 600
700 method of determining extent of basement rocks 700
701 step of analyzing available basement rock data for a given region 701
800 method of formulating a Drilling Exploration Model (DEM) 800
801 step of determining drilling parameters 801
802 step of iterating potential sites 802
803 step of computing DSI for the DEM for each potential waste site 803
804 method of formulating a Location Analysis Model (LAM) 804
805 step of determining the location parameters 805
806 step of iterating potential sites 806
807 step of computing LSI for the LAM for each potential waste site 807
808 step of plotting DSI and LSI data 808
809 step of selecting at least one optimal site 809
810 step of drilling at least one wellbore 810
811 step of re-initiating the search process if a major change occurs in implementing the original well-site data 811
812 step of finding a new optimal site by reviewing the optimality of the remaining location ranking from prior work 812
813 step of placing HLW capsules into lateral wellbores 813

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

The present invention can be more fully understood by reading the following detailed description of some of the embodiments, with reference made to the accompanying drawings. Turning now descriptively to the drawings, in which similar reference characters denote similar elements throughout the several views, the figures may illustrate a method of selecting a desired site for the disposal of nuclear waste in deep underground rock formations of the present invention and more especially in buried basement rock intrusions.

Figure 1B:
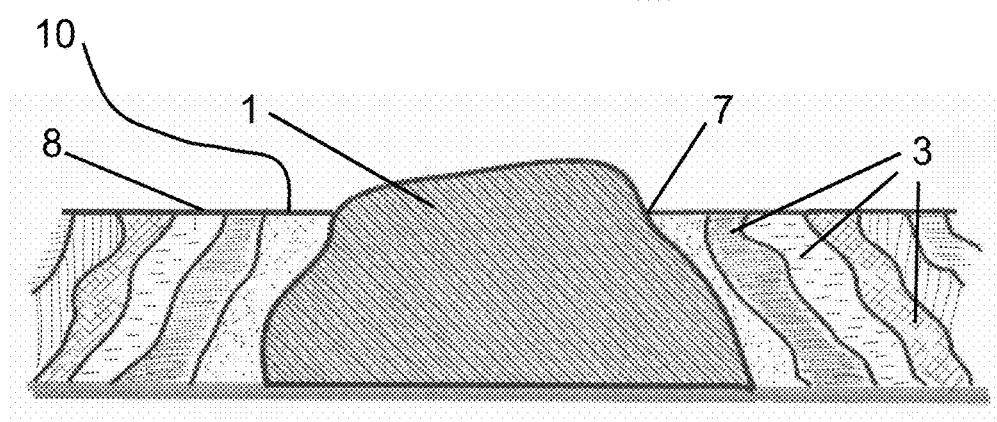
FIG. 1B may depict a cross section along sectional line A-B from FIG. 1A.

FIG. 1A and FIG. 1B may illustrate views of an exposed basement rock 1 (which may be a craton). FIG. 1A may include sectional line A-B. In some embodiments, the craton shown in FIG. 1A may be measured in hundreds of miles or thousands of miles in lateral extent. In FIG. 1A an exposed basement rock 1 (craton) may be surrounded by the surface features of sedimentary rocks 3 which may be surrounding exposed basement rock 1 (craton). Also shown in FIGS. 1A and 1n FIG. 1B is the demarcated edge of exposed basement rock 1 (craton) as the irregular boundary 7 of basement rock 1. Also illustrated in FIG. 1A is the areal surface outside of exposed basement rock 1 (craton) as shown by item 8. In some embodiments, item 8 may be land surface region adjacent to the exposed or above the buried basement rock 1 and/or 2. An additional illustrative element is the item 10. In some embodiments, item 10 may indicate a possible site for a substantially vertical wellbore 5 as an entry point for the deep nuclear repository 12. In some embodiments, item 10 may also indicate a selected (and in use) site 10 for the substantially vertical wellbore 5 as the entry point for the deep nuclear repository 12.

FIG. 1B may illustrate a cross-section along the line A-B of FIG. 1A. This FIG. 1B may illustrate an intrusion of an exposure of the exposed basement rock 1 at the surface of the land 8. The sedimentary rocks 3 may be shown as structures that have been pushed upwards and may have been eroded over geological time to expose basement rock 1 (craton).

It is generally accepted that consolidated sedimentary rocks 3 are easier to drill than the very hard igneous and metamorphic rocks normally present in the cratons or plutons of basement rocks 1 and/or 2.

Figure 2:
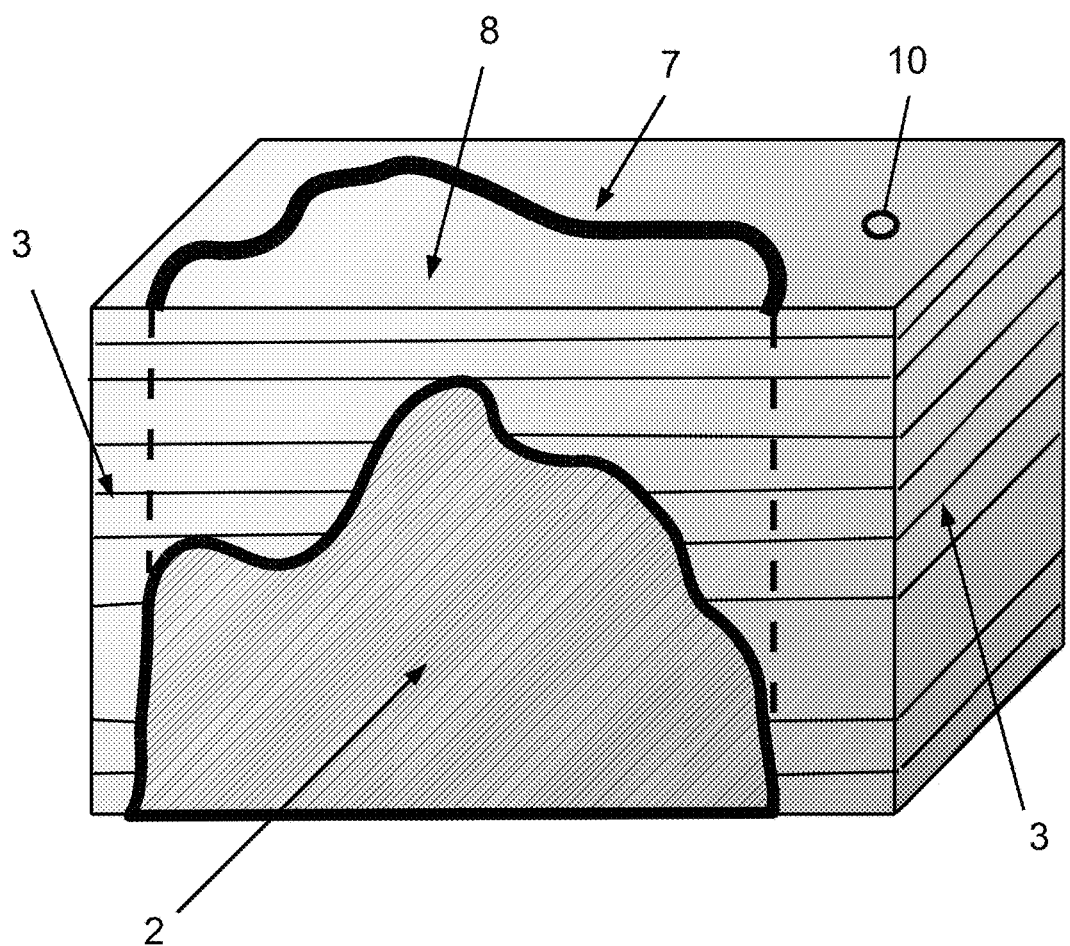
FIG. 2 may depict a partial view of a buried craton or basement intrusion, from a perspective cutaway view.

FIG. 2 may illustrate a three-dimensional attribution of a buried basement rock 2.

In some embodiments, buried basement rock 2 may be measured in tens to hundreds of miles in lateral extent. The basement rock 2 structure in FIG. 2 may be smaller than the basement rock 1 structure of FIG. 1A and FIG. 1B. Essentially FIG. 2 may show the delineated boundary 7 of the buried basement rock 2 as "projected" on to the surface of the region 8 (land surface 8). The "projected" boundary 7 demarcates the region outside of the basement rock 1 and/or 2, and in which the sites 10 for the substantially vertical wellbores 5 may be implemented in the subject embodiments. Shown in FIG. 2 may be the layered system of sedimentary rocks 3. In some embodiments, sedimentary rocks 3 may be substantially circumscribe basement rock 1 and/or 2. In some embodiments, sedimentary rocks 3 may be next to and touching at least some portions of basement rock 1 and/or 2.

Figure 3:
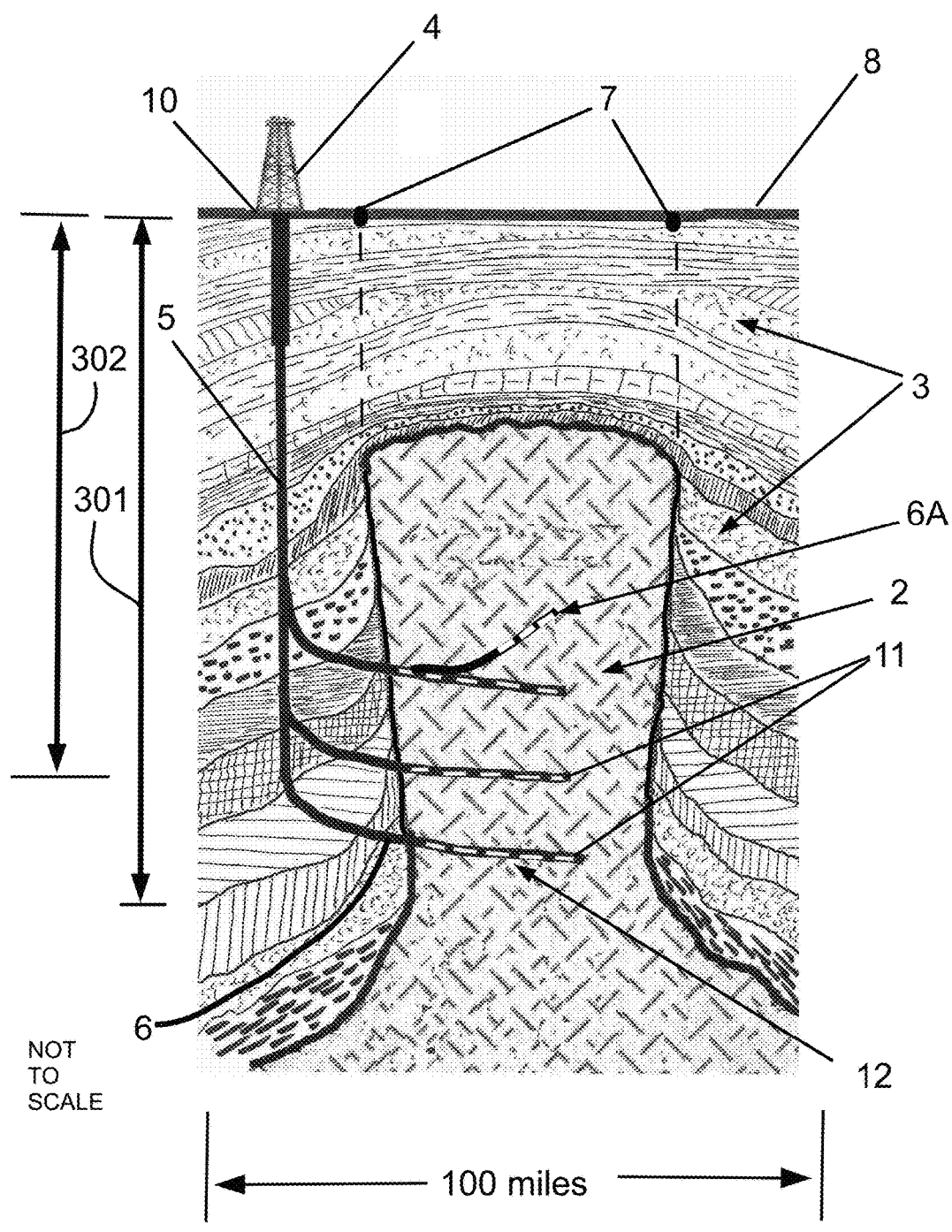
FIG. 3 may depict a vertical cross-section, not to scale, showing buried basement rock and a substantially vertical wellbore and a plurality of substantially lateral wellbores implemented into the subject buried basement rock structure.

FIG. 3 may depict a deep geologic repository system 12 of radioactive nuclear waste long term storage (disposal) implemented via at least one of the methods disclosed, shown, and discussed herein. In some embodiments, portions of buried basement rock 2, at least one substantially vertical wellbore 5, at least one substantially horizontal lateral wellbore 6, and capsule 11 for receiving radioactive nuclear waste as a group, may be components of nuclear repository system 12. It should be noted this FIG. 3 is not to scale either vertically or horizontally. In some embodiments, on the land surface 8 a nuclear drilling rig 4 for is expected to be implemented at a site location 10 from which at least one substantially vertical wellbore 5 may be drilled in sedimentary rocks 3 outside the demarcated boundary 7 of the buried basement rock 2. In some embodiments, the drilling of the substantially vertical wellbore 5 may be to a depth (second predetermined depth 302 in FIG. 3) that may extend from between substantially 4,500 feet to substantially 35,000 feet substantially vertically below land surface 8. In some embodiments, the drilling of the substantially vertical wellbore 5 may be to a depth (second predetermined depth 302 in FIG. 3) that may extend from between substantially 5,000 feet to substantially 30,000 feet substantially vertically below land surface 8. In some embodiments, substantially vertical wellbore 5 may be substantially within sedimentary rock 3. In some embodiments, this sedimentary rock 3 may be adjacent to buried basement rock 2. In some embodiments, this sedimentary rock 3 may be next to buried basement rock 2. In some embodiments, this sedimentary rock 3 may be touching at least some portion of buried basement rock 2. In some embodiments, from this substantially vertical wellbore 5, one or more (at least one) substantially horizontal lateral wellbore(s) 6 may be drilled into the direction of proximate buried basement rock 2. In some embodiments, from this substantially vertical wellbore 5, one or more (at least one) substantially horizontal lateral wellbore(s) 6 may be drilled into the proximate buried basement rock 2. In some embodiments, deep geologic repository system 12 may comprise a plurality of substantially lateral wellbores 6 which may partially traverse the buried basement rock 2. In some embodiments, one or more nuclear waste capsules 11 (containing radioactive nuclear waste) may be sequestered (deposited) into a portion of at least one of these substantially lateral wellbores 6 within the buried basement rock 2. In some embodiments, buried basement rock 2 shown in FIG. 3 may be ten to hundreds of miles wide (i.e., in a substantially horizontal or lateral direction). In some embodiments, buried basement rock 2 may be a pluton.

In some embodiments, directional notations of vertical, horizontal, and lateral may be respect to Earth's gravitational field. That is, vertical may be substantially parallel with Earth's gravitational field. Horizontal may be substantially perpendicular to vertical. Lateral may be substantially perpendicular to vertical. Horizontal may be substantially parallel with lateral.

In some embodiments, wellbore 5 may be less than perfectly vertical. In some embodiments, wellbore 6 may be less than perfectly horizontal. In some embodiments, wellbore 6 may be less than perfectly lateral. Use of "substantially" herein before vertical wellbore 5 may indicate that vertical wellbore 5 need not be perfectly vertical. Use of "substantially" herein before lateral wellbore 6 may indicate that lateral wellbore 6 need not be perfectly horizontal.

Continuing discussing FIG. 3, in some embodiments, first predetermined depth 301 may be a depth from land surface 8 in a downward direction that is substantially parallel with gravity. In some embodiments, first predetermined depth 301 may be a construct used in determining boundary 7. For example and without limiting the scope of the present invention, inside of boundary 7 down to first predetermined depth 301 may be substantially the basement rock 1 and/2 that may be in consideration for receiving at least one substantially lateral wellbore 6; whereas, outside of boundary 7 down to first predetermined depth 301 may be substantially no such basement rock 1 and/2. See e.g., FIG. 3.

In some embodiments, second predetermined depth 302 may be the depth of the substantially vertical wellbore 5. In some embodiments, second predetermined depth 302 may be less than first predetermined depth 301. In some embodiments, first predetermined depth 301 may be longer than second predetermined depth 302. See e.g., FIG. 3. In some embodiments, first predetermined depth 301 may be substantially similar in length with second predetermined depth 302. In some embodiments, second predetermined depth 302 may be greater than 4,500 feet and less than 35,000 feet. In some embodiments, the at least one substantially vertical wellbore 5 may be substantially 10 inches to substantially 50 inches in diameter.

In some embodiments, the substantially vertical wellbore 5 may be located substantially within sedimentary rock 3. In some embodiments, the substantially vertical wellbore 5 may be located substantially not within basement rock 1 and/or 2 (that may be in consideration for receiving at least one substantially lateral wellbore 6), including substantially not within intrusive igneous rock. See e.g., FIG. 3.

In some embodiments, the at least one underground basement rock 1 and/or 2 (that may be in consideration for receiving at least one substantially lateral wellbore 6) may comprise at least one intrusive pluton and/or at least one craton. See e.g., FIG. 1, FIG. 2, and FIG. 3.

In some embodiments, the at least one underground basement rock 1 and/or 2 (that may be in consideration for receiving at least one substantially lateral wellbore 6) may comprise at least some rock structure extending above the surface of land 8 and within the boundary 7. See e.g., FIG. 1 and FIG. 2.

In some embodiments, the at least one substantially lateral wellbore 6 may be at substantially 0 (zero) degrees to substantially 45 degrees with respect to a horizontal plane; wherein the horizontal plane may be substantially orthogonal to a direction of gravity. For example, and without limiting the scope of the present invention, when the degrees may be substantially zero degrees between this horizontal plane and the direction of run for the at least one substantially lateral wellbore 6, then the direction of run of the at least one substantially lateral wellbore 6 and this horizontal plane may be substantially parallel. See e.g., FIG. 3.

Note, in some embodiments, a depth of a deepest substantially lateral wellbore 6 may be deeper than its at least one substantially vertical wellbore 5. See e.g., FIG. 3.

In some embodiments, the at least one substantially lateral wellbore 6 may extend from substantially 500 feet to substantially 30,000 feet in length within the given basement rock structure 1 and/or 2. In some embodiments, the at least one substantially lateral wellbore 6 may be substantially 10 inches to substantially 50 inches in diameter. See e.g., FIG. 3.

In some embodiments, the at least one substantially lateral wellbore 6 may comprise at least one additional substantially lateral wellbore (see e.g., branching lateral wellbore 6A in FIG. 3) that may branch off of the at least one substantially lateral wellbore 6 and may be located within the at least one underground basement rock structure 1 and/or 2. In some embodiments, the at least one additional substantially lateral wellbore intersects the at least one substantially lateral wellbore 6 from an angle that may be greater than zero to less than 90 degrees (e.g., 30 to 50 degrees).

Note it is expressly contemplated that the buried basement rock 2 shown in FIG. 3 may be a basement rock 1 with at least some portions protruding above land surface 8.

Figure 4:
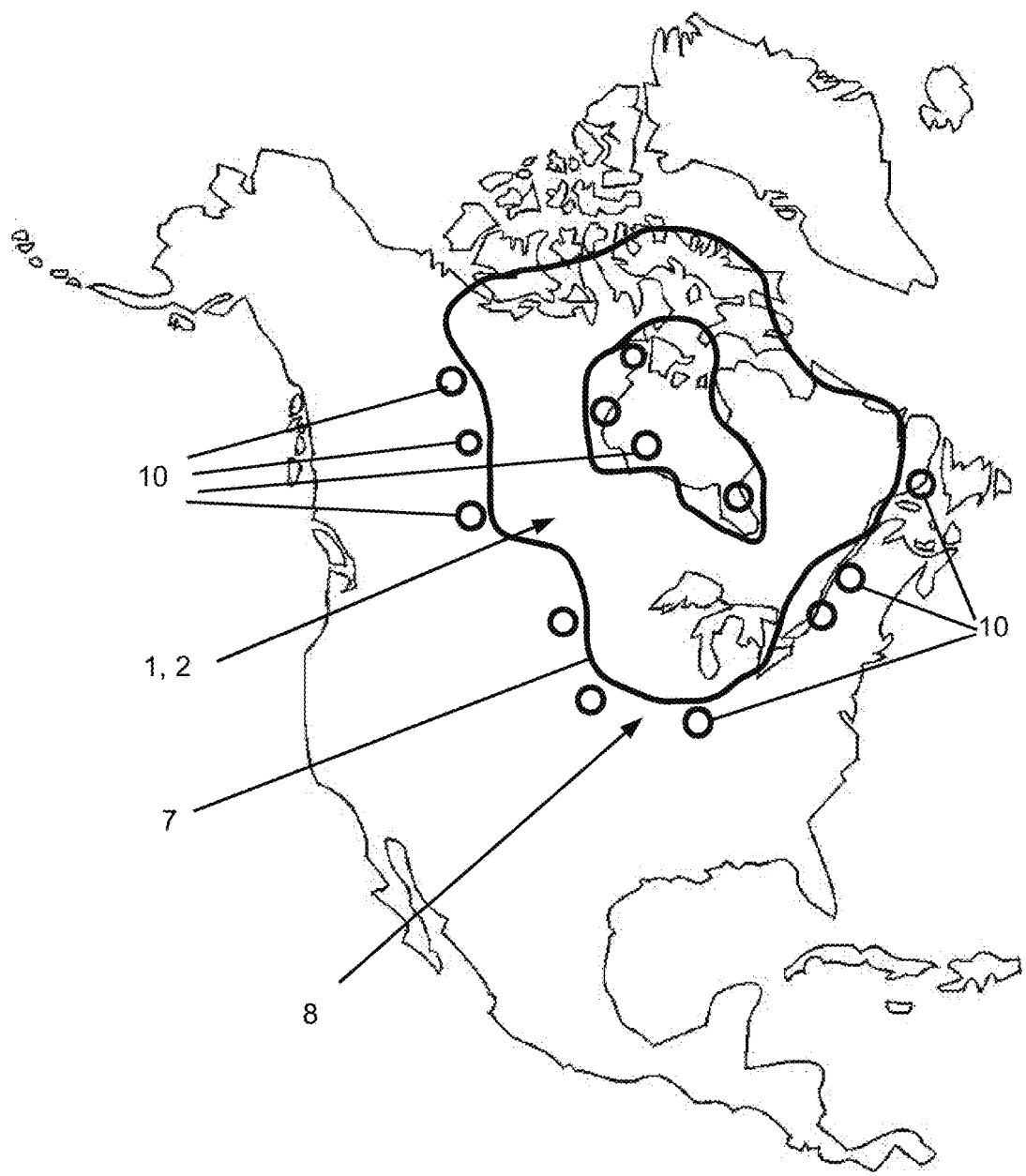
FIG. 4 may depict a top view approximation of the Canadian Shield basement rock structure and neighboring surrounding land with potential surface entry sites proximate to a boundary of the Canadian Shield.

FIG. 4 may depict a top view approximation of the Canadian Shield basement rock 1 and/or 2 structures and neighboring surrounding land with potential surface entry sites 10 proximate to a boundary 7 of the Canadian Shield basement rock 1 and/or 2. FIG. 4 may illustrate a composite of a way in which surface or buried basement rocks 1 and/or 2 can be indicated. The demarcated boundary 7 of the basement rock 1 and/or 2 is shown as an example in the North American land-mass specifically in Canada. Here the basement structures 1 and/or 2 are called the Canadian Shield. FIG. 4 may illustrate the locations of a plurality of possible sites 10 located outside the demarcation line 7 of the basement rocks 1 and/or 2 in the surrounding sedimentary rocks 3. In some embodiments, it may be contemplated to determine (select) at least one optimal site 10 from the plurality of sites 10 by utilizing an optimization mechanism or protocol which is further described in the instant patent application (see e.g., FIG. 5). FIG. 4 may not be to scale.

Figure 5:
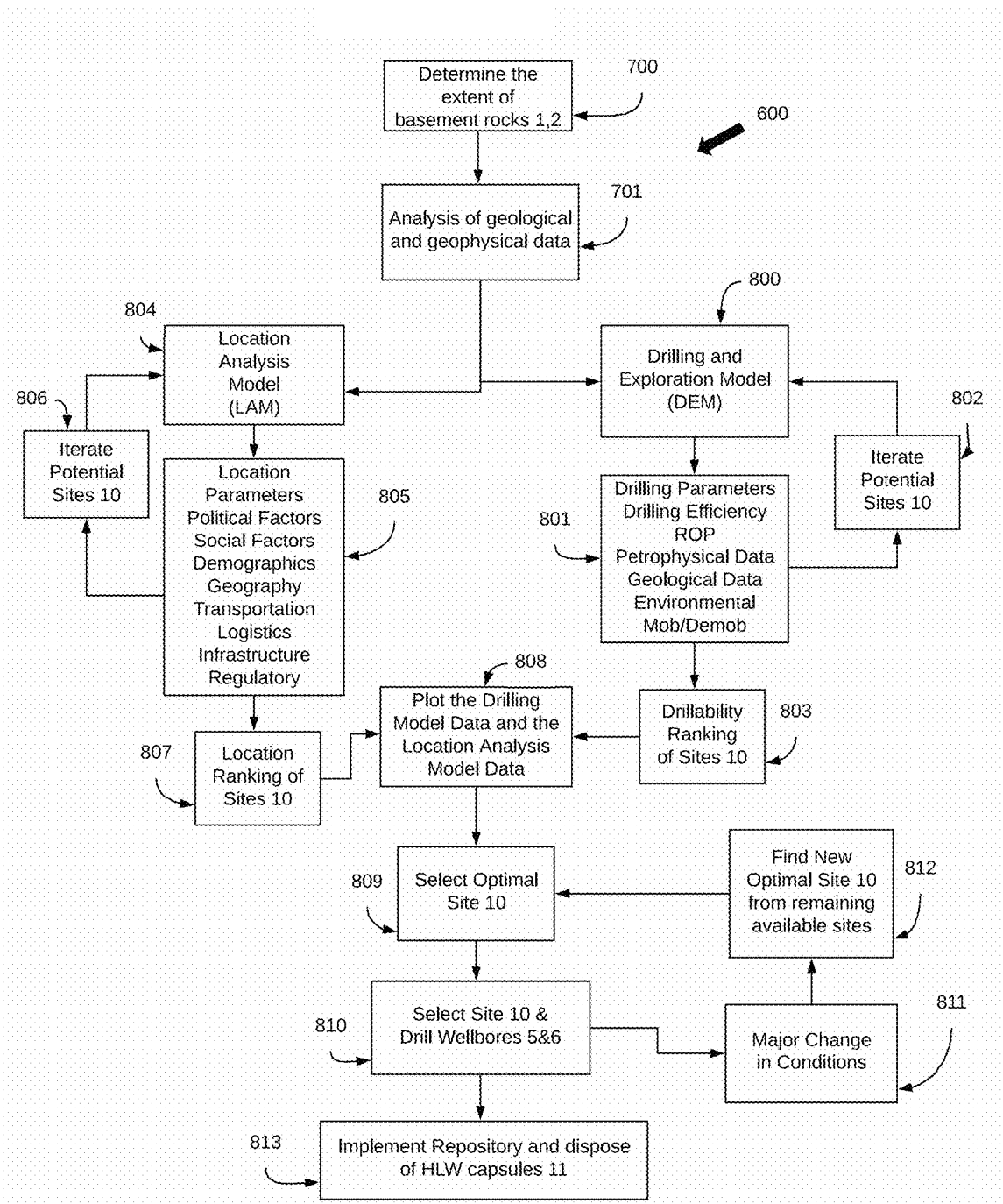
FIG. 5 may be a flow chart depicting methods and steps explained in this patent application.

FIG. 5 may depict a flowchart. FIG. 5 may depict method 600, method 700, method 800, and method 804. In some embodiments, method 600 may be a method of method of locating (siting) a deep underground nuclear waste repository 12. In some embodiments, method 600 may be a method for locating a suitable site for a deep underground nuclear waste repository 12. In some embodiments method 600 may be a method of determining at least one site (location) for the high-level waste repository 12. In some embodiments, method 600 may be a method of locating specific repository sites 10 for the high-level waste repository 12. In some embodiments method 600 may result in subterranean storage of nuclear waste in deep geological basement rocks formations 1 and/or 2.

Continuing discussing FIG. 5, in some embodiments, method 700 may be a method of determining an extent of basement rocks 700. In some embodiments, method 800 may be a method of formulating and/or implementing a Drilling Exploration Model (DEM) 800. In some embodiments, method 804 may be a method of formulating and/or implementing a Location Analysis Model (LAM) 804. In some embodiments, method 600 may comprise method 700, method 800, method 804, step 808, step 809, step 810, and step 813. In some embodiments, method 600 may also comprise step 811 and step 812. See e.g., FIG. 5. Several of these methods and/or steps may occur away from the final waste storage site 10 since at least some of the operational work required may be data-driven and/or analytical in nature. For example, and without limiting the scope of the present invention, method 700, steps of method 800, and/or steps of method 804 may be carried out away from a given site 10.

Continuing discussing FIG. 5, method 700 may determine regional and/or localized extent of basement rock formation intrusions 1 and/or 2. Understanding characteristics of a given basement rock 1 and/or 2 may be important as portions of the substantially lateral wellbore(s) 6 may be located (drilled into) such appropriate basement rock 1 and/or 2. In some embodiments, method 700 may comprise step 701. In some embodiments, step 701 may be a step of collecting, reviewing, and/or analyzing geological and geophysical data on basement rocks 1 and/or 2 of a given region. In some embodiments, step 701 may be used to delineate an areal extent of these basement rocks 1 and/or 2 regionally and/or locally. By analyzing the data in method 700 and/or step 701 the potential demarcation line 7 which shows the surface boundaries 7 between basement rocks 1 and/or 2 and the non-basement rock areas 8 may be determined. Initial drilling of the substantially vertical wellbore system 5 may be located outside of the basement rocks 1 and/or 2 and in the sedimentary rocks 3.

As shown in FIG. 4, the results of the analysis in the method 700 and/or step 701 may provide a graphic illustration of the possible locations or sites 10 of potential sites for implementation of the waste repository 12 and drilling of the at least one substantially vertical wellbore 5. In this specific illustration shown in FIG. 4 of the North American continental area the "Canadian Shield" is shown as basement rock structures 1 and/or 2, and the boundary 7 between these basement rocks 1 and/or 2 and the other areas of land 8 may be shown. The demarcation line 7 may be the edge of the basement rocks 1 and/or 2. A plurality of possible sites 10 may be shown in this illustration. It is along and adjacent to this line of demarcation 7 (but not within this boundary 7) that this invention may intend to locate the at least one substantially vertical wellbores 5 which may be drilled in the sedimentary rocks 3 initially, before continuing to be drilled substantially horizontally into the given basement rocks 1 and/or 2 and then emplacing the waste capsules 11.

In some embodiments, step 701 may be a step of locating the at least one underground basement rock structure (e.g., 1 and/or 2). In some embodiments, step 701 may utilize one or more of: preexisting geological and geophysical survey data, deep penetrating radar data, pilot exploration drilling data, combinations thereof, and/or the like. See e.g., FIG. 5.

In some embodiments, step 701 may be a step of determining the boundary 7. In some embodiments, step 701 may utilize one or more of: preexisting geological and geophysical survey data, deep penetrating radar data, pilot exploration drilling data, combinations thereof, and/or the like. See e.g., FIG. 5.

Continuing discussing FIG. 5, in some embodiments, in some embodiments method 700 may progress into method 800 and/or into method 804. In some embodiments, method 800 may follow from method 700. In some embodiments, method 804 may follow from method 700. In some embodiments, methods 800 and 804 may be carried out concurrently, partially concurrently, or sequentially. In some embodiments, methods 700, 800, and 804 proceed step 808. In some embodiments, method 800 may describes, formulate, and/or a drilling exploration model (DEM) comprising steps 801, 802, and 803. In some embodiments, method 804 may describe, formulate, and/or implement a location analysis model (LAM) comprising steps 805, 806, and 807. In some embodiments, step 803 may progress into step 808. In some embodiments, step 807 may progress into step 808.

Continuing discussing FIG. 5, in some embodiments step 808 may be a step of plotting on a two-dimensional graph (see e.g., FIG. 6) data derived from the location analysis model (LAM) and the drilling exploration model (DEM). In some embodiments, step 808 may progress into step 809. In some embodiments, an optimal site location 10 may be selected in step 809. In some embodiments, such plotting per step 808 may aid in step 809. For example, and without limiting the scope of the present invention, sites in Quadrant D (e.g., upper right quadrant) of a graph (chart) similar to FIG. 6 may indicate such optical site location(s) 10. In some embodiments, step 809 may progress into step 810.

In some embodiments, preceding a step of placing the surface entry of rig 4 of the at least one wellbore 5 may be a step of determining a location 10 of this surface entry. This may be step 809 and/or step 810. In some embodiments, the location 10 of the surface entry of rig 4 may be selected from a plurality of sites 10, wherein each site 10 selected from the plurality of sites 10 may be located outside of and proximate to boundary 7. See e.g., FIG. 4.

Continuing discussing FIG. 5, in some embodiments, in step 810 the wellbores 5 and 6 may be drilled. In some embodiments, step 810 may progress into step 813. In step 813 the repository 12 may be implemented and the waste capsules 11 may then be "landed" (deposited/placed/inserted) into the substantially (horizontal) lateral wellbores 6 that may have a portion within basement rocks 1 and/or 2 at the second predetermined depth 302.

Continuing discussing FIG. 5, in some embodiments, if during the drilling process of step 810, an uncorrectable and/or major operational problem requires re-drilling or relocation of the wellbore 5, then step 811 may be triggered. For example, and without limiting the scope of the present invention, major operational problems may be, but not limited to: well blowout problems, stuck drill pipe in the vertical wellbore problems, collapse of the wellbore, or other severe problems. Under such problem conditions the step 811 may be initiated and then step 812 may be implemented to allow method 600 to proceed anew by selecting an alternative site 10 based on the remaining previously ranked sites in the analysis obtained in methods 800 and/or 804. In step 811 and step 812 a new and different optimal site 10 may be selected from the remaining available site list (see e.g., Quadarant D of FIG. 6).

In some embodiments, method 600 may be a selection process for siting at least one wellbore (e.g., 5 and 6) for receiving nuclear waste for delivery of the nuclear waste into at least one underground basement rock structure (1 and/or 2). In some embodiments, method 600 may comprise the steps of:

(a) locating the at least one underground basement rock structure (1 and/or 2) that may be appropriate—see e.g., method 700 and/or step 701 of FIG. 5;

(b) determining a boundary 7 of the at least one underground basement rock structure (1 and/or 2); wherein within boundary 7 in a direction moving downwards with respect to a surface of land 8 may be at least some portion of the at least one underground basement rock structure (1 and/or 2) and outside of the boundary 7 in this downwards direction may be substantially none of the at least one underground basement rock structure (1 and/or 2) with respect to a first predetermined depth 301 from the surface of land 8—see e.g., FIG. 3 and see method 700 and/or step 701 of FIG. 5;

(c) placing surface entry (e.g., 10) of the at least one wellbore (e.g., 5) outside of boundary 7 but proximate to boundary 7—see e.g., FIG. 3 and see step 810 of FIG. 5;

(d) drilling substantially vertically at the surface entry to a second predetermined depth 302; wherein this drilling forms a substantially vertical wellbore (e.g., 5) that may be at least a portion of the at least one wellbore—see e.g., FIG. 3 and see step 810 of FIG. 5;

(e) drilling substantially horizontally from the substantially vertical wellbore (e.g., 5) to form at least one substantially lateral wellbore (e.g., 6); wherein the at least one substantially lateral wellbore (e.g., 6) may be another portion of the at least one wellbore; wherein the at least one substantially lateral wellbore (e.g., 6) may be drilled into at least a portion of the at least one underground basement rock structure (1 and/or 2)—see e.g., FIG. 3 and see step 810 of FIG. 5; and (f) depositing the nuclear waste (e.g., in capsule 11) into the at least one substantially lateral wellbore (e.g., 6) that may be drilled into the at least the portion of the at least one underground basement rock structure (1 and/or 2)—see e.g., FIG. 3 and see step 813 of FIG. 5.

In some embodiments, the step (b) (or of step 701) of determining the boundary 7 may utilizes one or more of: preexisting geological and geophysical survey data, deep penetrating radar data, pilot exploration drilling data, combinations thereof, and/or the like.

In some embodiments, proximate to boundary 7 of the step (c) may be substantially two miles or less. In some embodiments, proximate to boundary 7 of the step (c) may be substantially one mile or less. In some embodiments, proximate to boundary 7 of the step (c) may be one mile (plus or minus a quarter mile) or less. In some embodiments, proximate to boundary 7 of the step (c) may be at least a distance from boundary 7 that may still permit the step (d) (or step 810) of the drilling substantially vertically at the surface entry (e.g., 10) to the second predetermined depth 302 to be performed.

Figure 6:
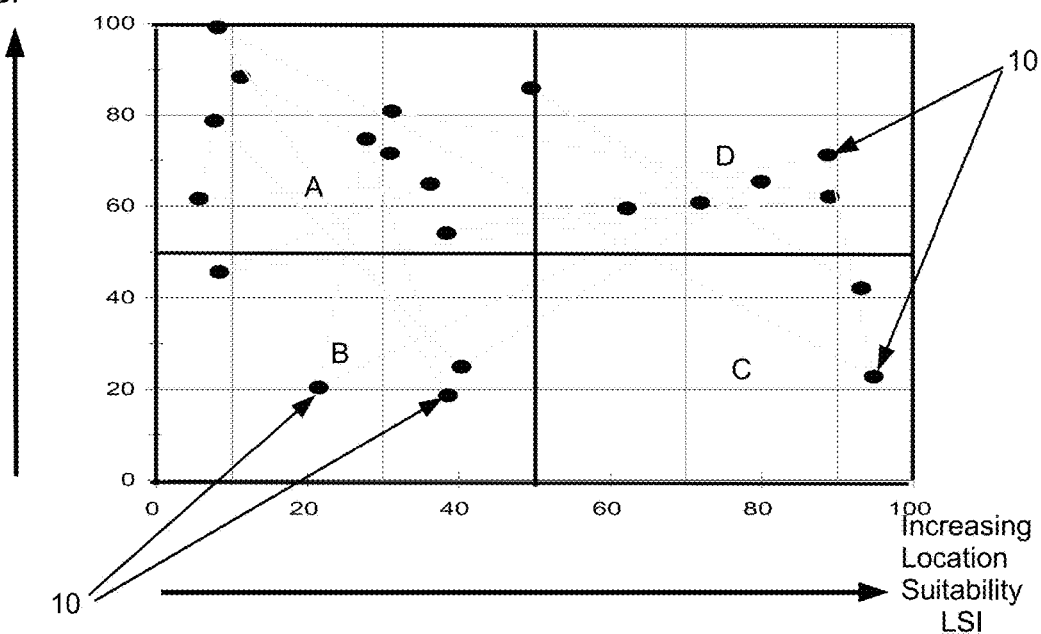
FIG. 6 may depict an example (sample) graph a plurality of selected potential sites against drilling suitability and location suitability.

FIG. 6 may depict an example (or sample) of a two-dimensional plot (graph) of the data determined from the drilling exploration model (DEM) and the location analysis model (LAM). This data may be plotted with the X-axis showing increased values of location suitability ("LSI" for location suitability index) while the Y-axis shows increasing values of drillability (drilling suitability or "DSI" for drilling suitability index). This FIG. 6 graph which may illustrate separate areal quadrants, A, B, C, and D. The quadrant D of the upper right quadrant may encompass best (most desirable) available sites since data plotted in this quadrant may have both higher location suitability (higher LSI) and higher drilling suitability (higher DSI) simultaneously. (Note, a comparable graph to FIG. 6, where the X and the Y axis are switched is expressly contemplated in the instant invention.)

Discussing FIG. 5, in some embodiments, in step 803 the drilling suitability index (DSI) of any specific site 10 may be computed as shown in example Table 1. In this example the drilling exploration model (DEM) has several descriptors or parameters which are shown in Table 1. Determining these DEM parameters may be step 801 of method 800. For example, and without limiting the scope of the present invention, at least some of these step 801 drill parameters may be: drilling efficiency, rate of penetration, formation geological properties, environmental impact, location of ground water, distances from population centers, mobilization costs, demobilization costs, and/or the like. This list does not exhaust the list of potential drilling parameters of step 801 used in this drilling exploration model (DEM).

There are available geological and geophysical data from public and proprietary databases which may provide at least some of the data to populate drill parameters considered in step 801. Commercial companies have cataloged millions of detailed records of all oil and gas wells ever drilled in many areas around the world. This data is also available at public sites of geological surveys, universities and state-supported data warehouses. In the embodiments illustrated in this application it is contemplated that analysis of this available data may play a role of the method(s) in designing and implementing drilling exploration models (DEM) and subsequently determining the optimal location for siting and drilling a deep nuclear repository system 12.

With regard to the drilling efficiency (a potential drilling parameter of step 801), this metric quantitively analyses the combined effects externalities or events on the drilling operations such as the required permitting processes, required regulatory processes, availability of operational materials, drilling tools availability, experienced local personnel, and the regional localities aversion or non-aversion to outside drilling companies. A subjective and empirical analysis is made of the factors and then a drilling efficiency metric is calculated and ranked between 0 to 100, and weighted between 0 to 1.00 based on accepted industry practice and then used in formulating the drilling exploration model (DEM) site Drilling Suitability Index (DSI) by multiplying the rating value by the weight of the selected parameter as shown in the upper section of Table 1.

With regard to the drilling rate of penetration (a potential drilling parameter of step 801), this metric is universally known as "ROP" and is a major factor in drilling technology. Normally shown as feet per hour, ROP is a measure of the ability of the selected drilling rig apparatus to penetrate the rock formations. ROP is a critical evaluative parameter and is usually obtained from database sources of earlier drilling operations where this parameter is routinely cataloged by drilling service companies. In some cases, the ROP may be derived by computer modeling using prior data for similar formations. The expected or simulated drilling rate of penetration (ROP) metric is analyzed and calculated and then this metric may be ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

With regard to the petrophysical formation properties (a potential drilling parameter of step 801), these may describe physical and chemical rock properties and their interactions with fluids. Some of the key properties studied in petrophysics may be lithology or differences of formation strata, porosity, water saturation, permeability, fractured systems, formation density, and/or the like. The interactions of formations with drilling fluids can create unintended and costly situations like washouts where enlargement of the hole size during drilling can occur if careful analysis and adherence to safe drilling policies are not followed prior and after drilling begins. The petrophysical formation properties may be calculated and analyzed using existing engineering and geological methodologies and the petrophysical formation properties metric may be calculated and then ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

With regard to the formation geological properties (a potential drilling parameter of step 801), it may be necessary that a suitable deep geologic repository has the prerequisite physical characteristics of stratigraphic continuity, hydrodynamic closure, and the lateral size, range and extension to allow long-term sequestration of high-level nuclear waste in the large extended substantially lateral wellbores. The formation geological properties data may be collected by seismic or exploratory means and analyzed and the metric may then ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

With regard to the environmental impact risk (a potential drilling parameter of step 801), a suitable environmental impact and risk assessment may provide an orderly means of evaluating the potential site location to achieve a quantifiable environmental metric for comparison. There are currently several published models which are used extensively today to study the impact of man-made influences on a given environmental location. These models may be utilized as stand-alone analytical tools which may quantify the environmental impact of projected nuclear waste drilling and disposal project. The environmental impact data may be analyzed to derive the environmental impact metric which is then ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

With regard to the distance from groundwater (a potential drilling parameter of step 801), this parameter which may form an economic basis for development in many areas is easily determined by existing regional water analysis databases by state and local regulators. The distance from groundwater data is analyzed with the larger the distance, the better the site potential, and the distance from groundwater metric is then ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

With regard to mobilization and demobilization costs (a potential drilling parameter of step 801), today, the mature drilling industry has developed suitable logistic, critical path, and transportation computer models that allow for economic prediction of these costs under a variety of economic, climatic, and political operating scenario forecasts. These models provide metrics which may even include Monte Carlo analysis variables which allow for embedding risk or uncertainty in the mobilization/demobilization model analysis. The computed mobilization/demobilization data may be analyzed and the resultant site metric is then ranked between 0 to 100, and weighted between 0 to 1.00 based on accepted industry practice and then used in formulating the drilling exploration model site drilling suitability index (DSI) by multiplying the rating value by the weight of the selected parameter as shown in the upper section of Table 1.

Continuing discussing FIG. 5, in step 805 of method 804, at least one location analysis parameter (factors) may be contemplated and determined. For example, and without limiting the scope of the present invention, Table 1 may list several such location analysis parameters. In some embodiments, the location analysis parameters may be selected from one or more of: political human factors, social human factors, demographics factors, geographic factors, transportation factors, logistics factors, infrastructure factors, regulatory factors, and/or the like. This list does not limit the total possibility of location analysis parameters (factors) contemplated and/or determined in step 805. Any of these LAM factors (parameters) may be ranked from 1 to 100 and weighted from 0 to 1.0, multiplied and totaled to determine a given location suitability index (LSI) for given location 10 being analyzed. See Table 1 and see FIG. 5.

With regard to the human political factors (a potential LAM parameter of step 805), these describe the politics and governmental issues which can significantly affect project development. Areas where the political acceptance for waste disposal is low and where there is organized and demonstrated resistance to the type of technology might rank very low on an acceptability scale. The human political factor data may be quantified by expert opinion and analysis to provide an input metric to the location analysis model (LAM).

With regard to the human social factors (a potential LAM parameter of step 805), these describe those factors which affect the quality of life and can significantly affect project development. Areas where the waste disposal process is perceived to affect the quality of life, whether actual or perceived might rank very low on the acceptability scale. The social, human factor data may be quantified by expert opinion and analysis to provide an input metric to the location analysis model (LAM).

With regard to the demographics factors (a potential LAM parameter of step 805), this parameter describes those factors based on the population types and their distribution in the prospective area. There has been a historical feeling by many peoples that industry generally tries to "dump" dangerous material in low income neighborhoods. The demographics data has to be quantified based on accepted norms and the effects on these populations affected. The demographics data may be quantified by expert opinion and analysis to provide an input metric to the location analysis model (LAM).

With regard to the geographic factors (a potential LAM parameter of step 805), these describe those physical and biological factors tied to the location, including climate, flora, and fauna, soils and topography, and may significantly affect project development. In some embodiments, geographic factors may also contemplate distances from population centers. Areas where the waste disposal process may modify and affect the geography, whether actual or perceived might rank very low on the acceptability scale. The geographic factors data may be quantified by expert opinion and analysis to provide an input metric to the location analysis model (LAM).

With regard to the transportation factors (a potential LAM parameter of step 805), these factors describe those transportation infrastructure systems that are available for the influx of machines and supplies related to nuclear waste technology development and sequestering of the waste capsules. An efficient system can offer minimum costs, reliability, economies of scale, and advantages in the implementation of the technology that is hampered by poor transportation. The transportation factor data may be quantified by expert opinion and analysis regarding rail, highway, river, and air transport to provide an input metric to the location analysis model (LAM).

With regard to the logistics factors (a potential LAM parameter of step 805), these factors describe the level of integration of the elements that affect transportation and commerce. The need for intermodal centers, terminals, inland ports, airports, seaports, major interstate highways, and rail connectivity provide for a high-value system that is a necessary condition for siting the nuclear waste. Presence of national and international delivery companies that operate minimal closures and/or downtime may be important to the smooth running of the nuclear waste site. The logistics factor data may be quantified by expert opinion and analysis to provide an input metric to the location analysis model (LAM).

With regard to the infrastructure factors (a potential LAM parameter of step 805), this factor describes the basic physical and organizational structures needed for development. Without a good infrastructure in place, very little development can occur especially the implementation of a technology like nuclear waste disposal. The infrastructure factor data may be measured by well-established yardsticks and quantified by expert opinion and analysis to provide an input metric to the location analysis model (LAM).

With regard to the regulatory factors (a potential LAM parameter of step 805), this factor describes the state, regional, local and national laws and regulations that may impact the siting of the nuclear waste disposal. These sometimes overlapping laws may create obstacles to the waste siting and their effects may be quantified by expert opinion and analysis to provide an input metric to the location analysis model (LAM).

In some embodiments, factor rating (parameter rating) models (e.g., DEM method 800 and/or LAM method 804) may be used for determining the optimality of a given location 10, since these models may contemplate, determine, and/or analyze a plurality of diverse factors (parameters) in a manner which may be easily, quickly, and reliably understood and/or utilized. These factor rating (parameter rating) models may generally consist of a weighted list of the factors (parameters) of predetermined ranges of values or coefficients for each factor (parameter). In some embodiments, each factor of a given group of factors (e.g., DEM drilling parameters of step 801 or the LAM parameters of step 805) may be assigned a suitability rating from one to 100 (see Table 1). In some embodiments, each factor of a given group of factors (e.g., DEM drilling parameters of step 801 or the LAM parameters of step 805) may be assigned a weight from zero to one (see Table 1). In some embodiments, the factors of a given group of factors (e.g., DEM drilling parameters of step 801 or the LAM parameters of step 805) may sum to 1.000, such that any assigned weight to a given factor within that group must be between zero and one (see Table 1). In some embodiments, the suitability rating value (e.g., from one to 100) may be multiplied against the weight (zero to one), for a given factor of a given group of factors (e.g., DEM drilling parameters of step 801 or the LAM parameters of step 805). This may result in a factor-weighted product. In some embodiments, these factor-weighted products may then summed to get a specific site 10 "factor rating number" for a given group factors (e.g., DEM drilling parameters of step 801 or the LAM parameters of step 805). In some embodiments, this "factor-rating number" may be assigned as an overall "factor rating" for a given group factors (e.g., DEM drilling parameters of step 801 or the LAM parameters of step 805). In some embodiments, these factor rating (parameter rating) models may sequentially compute the factor-rating for all the prospective sites 10 under consideration for the underground nuclear waste repository 12 to be sited and implemented. For example, and without limiting the scope of the present invention, these factor rating (parameter rating) models may be carried out in step 803 and/or step 807 shown in FIG. 5. For example, and without limiting the scope of the present invention, these factor rating (parameter rating) models may visually shown in Table 1 for one sample (example) site 10. In Table 1 "Lat" may refer to latitude and "Long" may refer to longitude of the proposed given location 10. In some embodiments, other and/or additional geographic location identifying information may be utilized.

In some embodiments, input from a subject matter expert/analyst may contribute to a selection of such factors (parameters), how the factors (parameters) are to be analyzed, rated, ranked, and/or weighted. Such subject matter expert/analysts may rate, rank, and weigh each site 10, objectively and/or subjectively, with a value from a predetermined range based on the suitability of the given site 10.

TABLE 1

| | Site Coordinates | |
|---|---|---|
| Site Name | Lat | Long |
| Thompson | 55.7487 | 97.851 |

| Factor (Parameter) | Rating (1-100) | Weight (0-1) | Factor-Rating Product |
|---|---|---|---|
| DRILLING-EXPLORATION MODEL (DEM) | | | |
| Drilling Efficiency | 30 | 0.30 | 9.00 |
| Rate of Penetration | 60 | 0.30 | 18.00 |
| Formation Petrophysical Properties | 45 | 0.10 | 4.50 |
| Formation Geological Properties | 56 | 0.10 | 5.60 |
| Environmental Impact | 25 | 0.10 | 2.50 |
| Mobilization/Demobilization Process | 30 | 0.10 | 3.00 |
| TOTAL | | 1.00 | 42.60 |
| Site Drilling Suitability Index (DSI) | 42.6 | | |
| LOCATION ANALYSIS MODEL (LAM) | | | |
| Political Human Factors | 30 | 0.20 | 6.00 |
| Social Human Factors | 60 | 0.15 | 9.00 |
| Demographics Factors | 45 | 0.10 | 4.50 |
| Geographic Factors | 56 | 0.10 | 5.60 |
| Transportation Factors | 25 | 0.15 | 3.75 |
| Logistics Factors | 30 | 0.10 | 3.00 |
| Infrastructure Factors | 50 | 0.10 | 5.00 |
| Regulatory Factors | 12 | 0.10 | 1.20 |
| TOTAL | | 1.00 | 38.05 |
| Site Location Suitability Index (LSI) | 38.05 | | |

In this example of Table 1 of a potential site located in North American, Thompson, with the given latitude and longitude, the Drilling Suitability Index (DSI) may be 42.6 and the Location Suitability Index (LSI) may be 38.5. In some embodiments, DSI and LSI may be examples of the "factor-rating number" noted above. In some embodiments, these indices (DSI and LSI) may be computed (determined) for all the available sites 10 in the region under consideration for the to be sited and implemented disposal system 12. In some embodiments, as an alternative to step 808, the indices may be then ordered in numerical order and a selection (i.e., step 809) may be made to determine the optimal site 10 for the to be implemented deep underground disposal repository 12.

In some embodiments, one or more optimal site location(s) 10 may be determined graphically by analyzing a plurality of potential sites 10 and then plotting (see e.g., step 808 of FIG. 5) the results of the Drilling Suitability Index (DSI) derived from the Drilling Exploration Model (DEM) (see 800-803 in FIG. 5) and the Location Suitability Index (LSI) data derived from the Location Analysis Model (LAM) (see 804-807 in FIG. 5) on a two-dimensional (two orthogonal axis) graph. For example, a list of potential sites 10 and their metrics based on the DEM (DSI) and LAM (LSI) data may be shown in Table 2 shown below. Using this example, the DSI and LSI data values for each prospective location 10 may be plotted with the X-axis showing increasing LSI values, and the Y-axis showing the increasing DSI values. The distribution of the plotted values might show a scattering of points with the most favorable points aggregating in the upper right quadrant of the display. The optimal location(s) 10 may be selected from the points in the best quadrant of the graph. An upper right quadrant may be a best quadrant as this quadrant may have both the highest LSI and the highest DSI. See e.g., FIG. 6 that may depict an example of the analysis and plotting of several sites 10 LSI and DSI data. A best (optimal) site 10 may selected from those that are present in quadrant D of the FIG. 6 as an example, which may correspond with step 809 of FIG. 5.

TABLE 2

| Site | DSI | LSI |
|---|---|---|
| 1 | 88.3 | 11.2 |
| 2 | 71.6 | 31.0 |
| 3 | 80.8 | 31.2 |
| 4 | 62.0 | 89.0 |
| 5 | 45.6 | 8.4 |
| 6 | 64.8 | 36.2 |
| 7 | 61.7 | 5.7 |
| 8 | 78.8 | 7.7 |
| 9 | 24.9 | 40.4 |
| 10 | 65.3 | 79.9 |
| 11 | 59.5 | 62.2 |
| 12 | 54.1 | 38.4 |
| 13 | 71.2 | 88.7 |
| 14 | 22.7 | 94.8 |
| 15 | 99.2 | 8.2 |
| 16 | 18.6 | 38.6 |
| 17 | 74.8 | 27.8 |
| 18 | 20.4 | 21.5 |
| 19 | 60.7 | 71.9 |
| 20 | 85.9 | 49.6 |
| 21 | 42.1 | 93.1 |

Note, where Table 1 may show how given DSI and LSI may be determined for a specific given location 10, Table 2 may show the DSI and LSI for a plurality of locations 10. In some embodiments, FIG. 6 and Table 2 may show the same data. In some embodiments, the example of DSI and LSI of Table 1 may not be shown in FIG. 6 nor in Table 2.

In some embodiments, the location 10 of the surface entry of rig 4 may be a site 10 selected from the plurality of sites 10 with a calculated drilling suitability index (DSI) of greater than fifty. In some embodiments, the location 10 of the surface entry of rig 4 may be a site 10 selected from the plurality of sites 10 with a calculated location suitability index (LSI) of greater than fifty. See e.g., step 809 of FIG. 5 and FIG. 6, where upper right quadrant D shows DSI and LSI values of greater than fifty.

In some embodiments, the graphical approach of step 808 of FIG. 5 and as shown by example in Table 2 and in FIG. 6, may be replaced with a software algorithm (programmed algorithm) that performs the graphical approach of step 808. Such a software algorithm may be an optimization algorithm.

In some embodiments, more complex and well-established analytical techniques such as Linear Programming and Distribution Analysis network analysis and/or the like may be used to determine one or more optimal sites 10 from factors (parameters) suitability ratings and weighted assignments.

Methods for siting (locating) a deep geological underground storage repository for radioactive nuclear waste has been described. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A selection process for siting at least one wellbore for receiving nuclear waste for delivery of the nuclear waste into at least one underground basement rock structure, the selection process comprising the steps of:
    (a) locating the at least one underground basement rock structure;
    (b) determining a boundary of the at least one underground basement rock structure; wherein within the boundary in a direction moving downwards with respect to a surface of land is at least some portion of the at least one underground basement rock structure and outside of the boundary in the downwards direction is substantially none of the at least one underground basement rock structure with respect to a first predetermined depth from the surface of land;
    (c) placing surface entry of the at least one wellbore outside of the boundary but proximate to the boundary;
    (d) drilling substantially vertically at the surface entry to a second predetermined depth; wherein this drilling forms a substantially vertical wellbore that is at least a portion of the at least one wellbore;
    (e) drilling substantially horizontally from the substantially vertical wellbore to form at least one substantially lateral wellbore; wherein the at least one substantially lateral wellbore is another portion of the at least one wellbore; wherein the at least one substantially lateral wellbore is drilled into at least a portion of the at least one underground basement rock structure; and
    (f) depositing the nuclear waste into the at least one substantially lateral wellbore that is drilled into the at least the portion of the at least one underground basement rock structure.

2. The selection process according to claim 1, wherein the second predetermined depth is less than the first predetermined depth.

3. The selection process according to claim 1, wherein the second predetermined depth is greater than 4,500 feet and less than 35,000 feet.

4. The selection process according to claim 1, wherein the substantially vertical wellbore is located substantially within sedimentary rock.

5. The selection process according to claim 1, wherein the substantially vertical wellbore is located substantially not within basement rock, including substantially not within intrusive igneous rock.

6. The selection process according to claim 1, wherein the at least one underground basement rock comprises at least one intrusive pluton.

7. The selection process according to claim 1, wherein the at least one underground basement rock comprises at least some rock structure extending above the surface of land and within the boundary.

8. The selection process according to claim 1, wherein the at least one substantially lateral wellbore extends from substantially 500 feet to substantially 30,000 feet in length.

9. The selection process according to claim 1, wherein a diameter of the at least one substantially lateral wellbore is substantially 10 inches to substantially 50 inches.

10. The selection process according to claim 1, wherein the at least one substantially lateral wellbore comprises at least one additional substantially lateral wellbore that branches off of the at least one substantially lateral wellbore and is located within the at least one underground basement rock structure.

11. The selection process according to claim 9, wherein the at least one additional substantially lateral wellbore intersects the at least one substantially lateral wellbore from an angle that is greater than zero to less than 90 degrees.

12. The selection process according to claim 1, wherein the at least one substantially lateral wellbore is at substantially 0 degrees to substantially 45 degrees with respect to a horizontal plane; wherein the horizontal plane is substantially orthogonal to a direction of gravity.

13. The selection process according to claim 1, wherein the step (a) of locating the at least one underground basement rock structure utilizes one or more of: preexisting geological and geophysical survey data, deep penetrating radar data, or pilot exploration drilling data.

14. The selection process according to claim 1, wherein the step (b) of determining the boundary utilizes one or more of: preexisting geological and geophysical survey data, deep penetrating radar data, or pilot exploration drilling data.

15. The selection process according to claim 1, wherein proximate to the boundary of the step (c) is substantially one mile or less.

16. The selection process according to claim 1, wherein proximate to the boundary of the step (c) is at least a distance from the boundary that still permits the step (d) of the drilling substantially vertically at the surface entry to the second predetermined depth to be performed.

17. The selection process according to claim 1, wherein preceding the step (c) of the placing of the surface entry of the at least one wellbore is a step of determining a location of the surface entry.

18. The selection process according to claim 16, wherein the location of the surface entry is selected from a plurality of sites, wherein each site selected from the plurality of sites is located outside of and proximate to the boundary.

19. The selection process according to claim 17, wherein the step of determining the location of the surface entry comprises considering one or more factors for each site selected from the plurality of sites, wherein the one or more factors are selected from the group of: drilling efficiency, rate of penetration, formation petrophysical properties, formation geological properties, environmental impact, location of ground water, and mobilization and demobilization costs.

20. The selection process according to claim 18, wherein each of the one or more factors is assigned a suitability rating from one to one hundred, wherein each of the one or more factors is assigned a weight from zero to one, wherein for each of the one or more factors the suitability rating and the weight are multiplied together yielding a factor-rating product, wherein the factor-rating products are summed to yield a drilling suitability index that will be between zero and one hundred, wherein the location of the surface entry is a site selected from the plurality of sites with a calculated drilling suitability index of greater than fifty.

21. The selection process according to claim 17, wherein the step of determining the location of the surface entry comprises considering one or more factors for each site selected from the plurality of sites, wherein the one or more factors are selected from the group of: political human factors, social human factors, demographics, geographic location, operations and logistics, infrastructure elements, and regulatory factors; wherein each of the one or more factors is assigned a suitability rating from one to one hundred, wherein each of the one or more factors is assigned a weight from zero to one, wherein for each of the one or more factors the suitability rating and the weight are multiplied together yielding a factor-rating product, wherein the factor-rating products are summed to yield a location suitability index that will be between zero and one hundred, wherein the location of the surface entry is a site selected from the plurality of sites with a calculated location suitability index of greater than fifty.

* * * * *